United States Patent [19]

Lambert et al.

[11] 4,010,683
[45] Mar. 8, 1977

[54] LIQUID LEVEL CONTROL

[75] Inventors: Gerard Edouard Lambert, Saint-Cloud; Roger Begis, Chaville, both of France

[73] Assignee: Societe Seveg Etudes Equipments Graphiques, Sevres, France

[22] Filed: May 14, 1976

[21] Appl. No.: 686,379

Related U.S. Application Data

[63] Continuation-in-part of Ser. No. 550,346, Feb. 18, 1975, abandoned.

[30] Foreign Application Priority Data

Feb. 19, 1974 France .............................. 74.05490

[52] U.S. Cl. .............................................. 101/366
[51] Int. Cl.$^2$ .......................................... B41F 31/08
[58] Field of Search .......... 101/350, 363, 364, 366, 101/207, 208, 210; 222/522, 523, 504; 251/210, 343, 344, 347; 118/259

[56] References Cited

UNITED STATES PATENTS

| | | | |
|---|---|---|---|
| 1,924,731 | 8/1933 | Barnes | 101/366 |
| 2,225,421 | 12/1940 | Marchev | 101/132 X |
| 3,339,485 | 9/1967 | Rytterholm | 101/363 |
| 3,647,038 | 3/1972 | Balz | 192/141 |
| 3,804,010 | 3/1972 | Zeuthen | 101/119 |
| 3,848,529 | 11/1974 | Gegenhemer et al. | 101/363 |

*Primary Examiner*—J. Reed Fisher
*Attorney, Agent, or Firm*—Leydig, Voit, Osann, Mayer & Holt, Ltd.

[57] ABSTRACT

An ink supply and ink level control device is mounted on an ink fountain of a printing machine. The device has a control and power head and an ink supply conduit and casing assembly removably connected to the head. The head includes a reciprocable output member, a reversible drive motor connected to produce limited linear displacement in one direction or the other of the output member, a pair of limit switches mounted for operation in response to movement of said output member to the limits, respectively, of its linear displacement, and an electronic proximity detector projecting from said head toward the surface of ink in said ink fountain to sense the relative proximity of the surface of the ink. The assembly includes a conduit for receiving ink from a source of ink and is removably fastened to the output member for limited linear displacement thereby, and an elongated tube-like casing partially enclosing said supply conduit and removably fastened at one end to the head. The conduit has multiple, spaced wall orifices, and valve means are provided for controlling the discharge of ink through the orifices which are opened at one limit of the linear displacement of the conduit by the output member and are closed at the other limit of its linear displacement thereby. Automatic control means are also included in the head for maintaining a predetermined level of ink in the ink fountain in the form of electric circuit means connecting the proximity detector and limit switches to activate the motor to displace said conduit to its limit in one linear direction or the other for opening or closing the valve means responsive to the level of ink in the ink fountain.

6 Claims, 5 Drawing Figures

LIQUID LEVEL CONTROL

This is a continuation-in-part of my application Serial No. 550,346, now abandoned, filed Feb. 18, 1975.

The invention relates to apparatus for maintaining substantially constant the level of a liquid, such as the ink in the ink fountain from which the ink fountain rollers of a printing machine are supplied.

Printing machines include various types of ink fountains, one type being known as an undershot ink fountain having the bottom of the ink fountain formed by an adjustable and flexible blade bearing upon the surface of a rotating ink fountain roller. Adjustment of the blade relative to the roller creates between them a gap of variable width, which permits control of the thickness of the ink film deposited on the ink fountain roller. It is desirable to equip ink fountains of this type with automatic supply apparatus for maintaining a constant predetermined ink level. It is known to use for that purpose a level control system comprising a detector which responds to variations in the quantity of ink within the ink fountain to initiate, when the ink level falls, the resupply of ink to maintain the desired level. In one known arrangement the detector consists of a liquid sensor extending into the ink fountain and associated with supply means which tap the reserve whenever the ink level falls to the point that the liquid sensor is no longer in direct contact with the ink.

This arrangement had the disadvantage of complexity and high cost. In addition, such ink fountain supply apparatus generally conveys the ink through a single conduit discharging into an ink fountain at the end opposite the detector, which makes it difficult if not impossible to subdivide the ink fountain, when it is desired to reduce its length.

Moreover, due to its complexity such an ink supply apparatus is difficult to replace. This is a serious disadvantage because it makes it necessary to thoroughly clean the apparatus when it becomes necessary to use ink of a different color, rather than to replace the apparatus with another for the new color.

Accordingly, it is an object of the invention to provide apparatus for automatically maintaining the ink level in the ink fountains of printing machines in the form of unitary devices having the electronic and mechanical means for performing all functions required to supply ink and maintain a predetermined ink level in an ink fountain.

A related object is to provide such devices which are completely portable so that they may be carried from one press to a different press, being readily disconnected from one ink reservoir and reconnected to another. This facilitates both the cleaning of the devices, since they are unitary and self-contained and readily handled for cleaning, and when removed from over an ink fountain the ink fountain itself may more readily be cleaned.

Another important object of the invention is to provide in apparatus for automatically maintaining a predetermined level of ink in ink fountains, means for sensing the level of ink embodying a detector system which does not contact the ink itself and thus does not require as frequent cleaning, and does not depend on liquid sensing or require mechanical movement to sense ink level changes, but rather is totally electronic and senses the relative proximity of the ink level remotely.

Another object of the invention is to provide such unitary ink supply devices having two components, first a power and control head with proximity detector for sensing liquid level, and second, a valve ink supply conduit connected to and operated by the head, which devices have all means for performing the functions of supplying ink and maintaining automatically a predetermined ink level in an ink fountain.

Another object is to provide such devices having two components wherein the components are readily and easily disconnected, so that the valve ink supply conduit may readily be disconnected and removed to facilitate changing from one color of ink to another by enabling the reconnection to the head of another similar valve ink supply conduit connected to the reservoir of ink of the new color.

Another object of the invention is to provide such devices with valve ink supply conduits having multiple valve means spaced along the length of the conduits which enables location of discharge of the ink from the devices to be changed from one segment of an ink fountain to another segment, or the ink fountain effective length to be changed by subdividing the ink fountain of a multi-color press to use only a fraction of the ink fountain length.

Other objects and advantages will be evident to anyone skilled in the art from the following description taken in the light of the accompanying drawings wherein.

Figure 1:
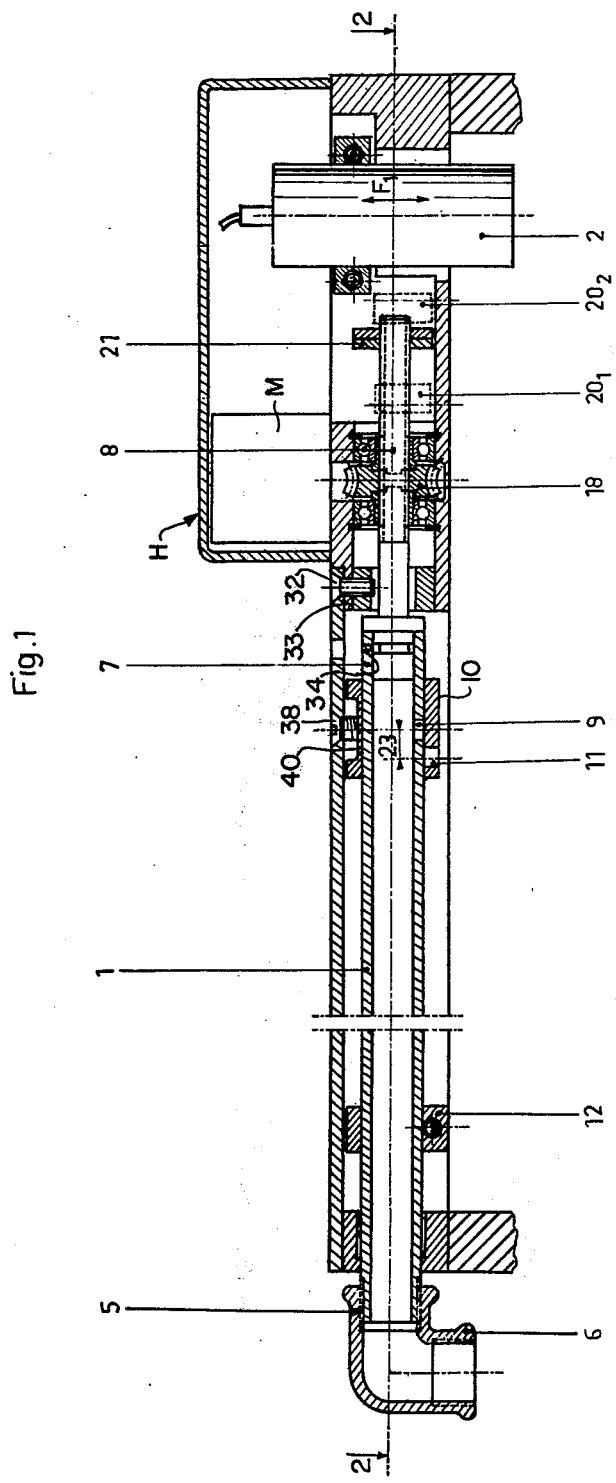
FIG. 1 is a vertical, longitudinal cross-sectional view of an ink supply device embodying the invention.
Figure 2:
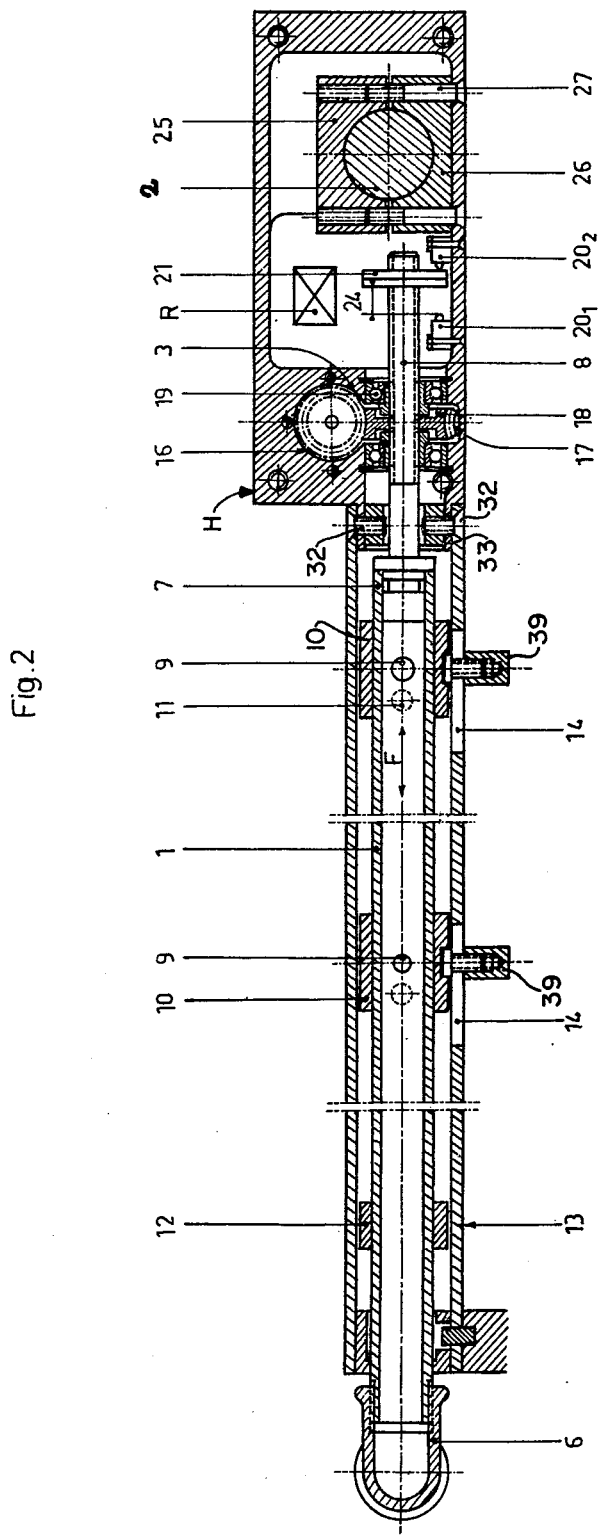
FIG. 2 is a horizontal, longitudinal cross-sectional view of the ink supply device shown in FIG. 1 and as taken in the plane of lines A—A of FIG. 1.

Referring to FIGS. 1 and 2, the preferred embodiment shown therein of apparatus for automatically supplying ink to and maintaining a predetermined ink level in the ink fountain of a printing machine comprises a device formed of two components: a control and power head H; and a valved ink supply conduit 1 removably connected at one end to the head H, and leading at its other end 5 via an elbow fitting 6 to an ink reservoir provided with a pump (not shown) which supplies ink to the conduit 1. The valved ink supply conduit 1 and head H together provide a unitary ink supply device which is adapted to be mounted on an ink fountain 4 — shown in FIG. 3, with the conduit 1 extending horizontally, aligned over the elongated fountain and above the surface of the ink in the fountain. The supply conduit 1 has longitudinally spaced orifices 9 on the lower side of the conduit 1 from which ink is discharged into the ink fountain. In the region of these distribution orifices 9, the conduit is surrounded by fixed sleeves 10 in the form of annular rings and the conduit 1 is movable linearly under control and power provided by the head H for movement of its orifices 9 into and out of radial register with orifices 11 in the fixed sleeves 10, said sleeves 10 and conduit 1 and the orifices 9, 11 in both members providing valve means for controlling the discharge of ink from said conduit 1 into the ink fountain 4.

Figure 3:
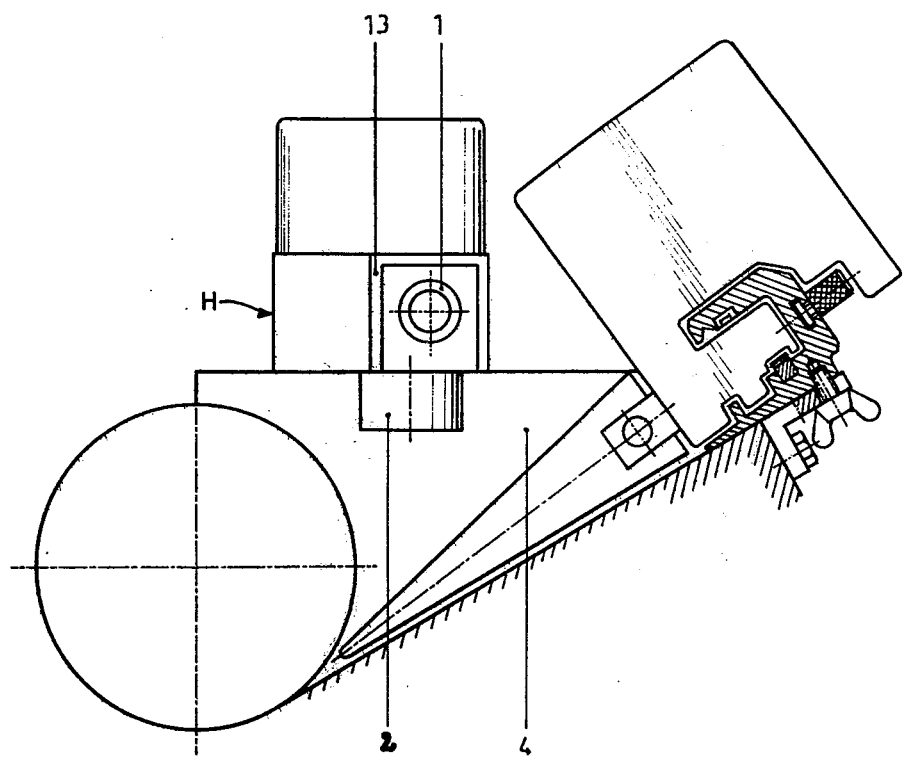
FIG. 3 is an end elevation of the ink supply device shown in FIG. 1, mounted on the ink fountain of a printing machine.
Figure 4:
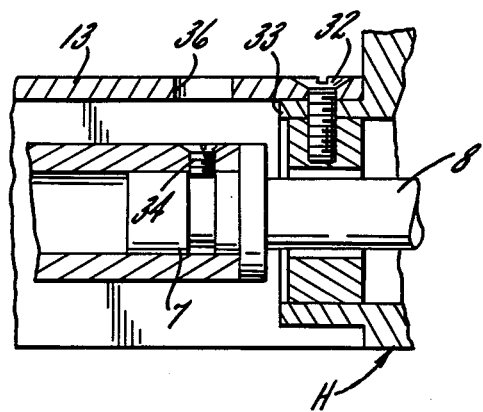
FIG. 4 is an enlarged fragmentary view illustrating the separable connection between the ink supply conduit and power head.

The conduit 1 is partially enclosed and protected by an elongated tube-like casing 13 which, as shown in FIG. 3, has a cross-section in the shape of an inverted U, such that the underside of the casing 13 is completely open permitting the ink to be discharged from the conduit orifices 9. While the conduit 1 is displaceable linearly by power from the head H, it is retained against rotation by one or more split rings 12 (FIG. 2) of polygonal exterior shape matching the inside shape of the casing 13, which are clamped on to the conduit 1 and are slidable along the inside of the casing 13 as the conduit moves linearly while cooperating with the casing to prevent rotation of the conduit.

In accordance with the invention, the ink supply device comprising the head H and valved ink supply conduit 1 includes automatic means for sensing the level of ink in the ink fountain and maintaining the predetermined level desired, by a detector system which does not contact the ink itself and does not depend upon liquid sensing or mechanical movement to sense the changes in level of the ink but rather is totally electronic and senses the proximity of the surface of the ink remotely. In carrying out this invention, the control and power head H includes a proximity detector 2, a motor M connected to produce linear displacement of the conduit 1, and an electrical circuit means connecting the proximity detector 2 to activate the motor M responsive to changes in the level of ink in the ink fountain and thereby control discharge of ink through the conduit orifices 9 to the ink fountain.

One of the important features of the ink supply device of this invention is that it is in the form of a unitary device which is completely portable so that it may be carried from one press to a different press, being readily disconnected from one ink reservoir and reconnected to another. This facilitates both the cleaning of the device since it is unitary and self-contained and readily handled for cleaning, and when removed from over an ink fountain the ink fountain itself may more readily be cleaned. It is also an important feature that the valved ink supply conduit 1 and casing 13 are removably connected to the head H so that the supply conduit 1 and casing 13 may readily be disconnected and removed, as in the case of changing from one color of ink to another, and enabling the reconnection to the head of another similar casing and supply conduit connected to the reservoir of ink of the new color. Thus the casing 13 is connected as by set screws 32 (FIGS. 1, 2) to a projecting element 33 fixed to the head H. Also, the conduit 1 is removably connected as by a set screw 34 to the end 7 of an output shaft projecting from the power head and which is operable to linearly displace the conduit 1 by power provided by the head H. Access to the set screw 34 is provided through an opening 36 in the casing 13 (FIG. 1). Thus by loosening the set screws 32, 34, the conduit 1 and casing 13 may be removed from the head H.

Figure 5:
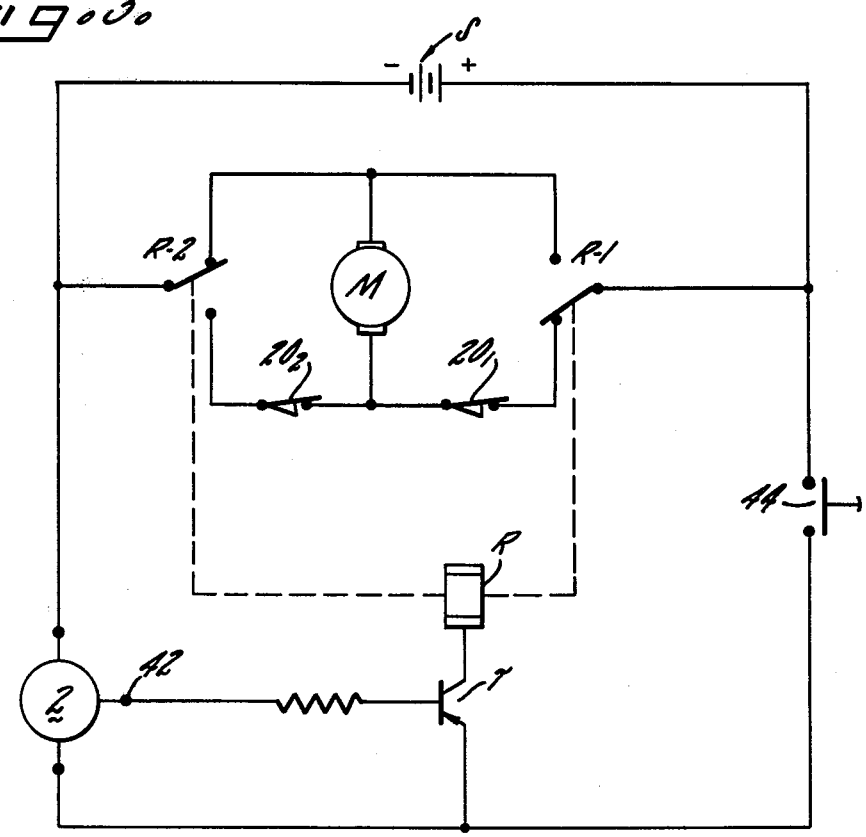
FIG. 5 is a schematic circuit diagram of the control circuit embodied in the device of FIG. 1.

Referring further to FIGS. 1 and 2, the control and power head H has mounted thereon by means of a clamp which allows its vertical adjustment as indicated by the arrow F1, for predetermining the ink level desired, a cylindrical proximity detector 2 herein shown as a conventional capacitive device for sensing by changes in its internal capacitance the relative proximity of the surface of the ink in the fountain 4, the device sold by IFM Electronic Gmbh., Essen, Germany, part No. KB3020, having been found suitable for this purpose. The proximity detector 2 is essentially a switch device which, in a circuit like that shown in FIG. 5, is operable to connect the plus or minus bus from a power source S to an output terminal depending on the relative proximity of the surface of the ink in the ink fountain, for control purposes.

For linearly displacing the ink supply conduit 1, to open and close the orifices 9 in said conduit, the head H includes a worm gear 8 reciprocably mounted in the head and having an output shaft portion extending from the worm gear with an end 7 projecting from the head H for removable connection to the ink supply conduit 1. The worm gear 8 is displaced linearly in one direction or the other by means of a gear 18 encircling the worm gear 8 and having an internal thread which cooperates with the worm gear 8. A drive gear 16 operated by the motor M meshes with the gear 18 an drives the same in one direction or the other according to the direction of rotation of the motor M, the motor M being a conventional, reversible DC motor. In this manner, the worm gear 8 supported in bearings 19 is linearly displaced to also linearly displace the conduit 1, the limit of its linear displacement being determined by the longitudinal spacing between a pair of limit switches $20^1$ and $20^2$ mounted in spaced relation adjacent the inner end of said worm 8 and which are engaged by a switch contact member 21 carried by the worm 8 between and for movement into abutment alternately against the limit switches to operate the switches upon such linear displacement of the worm. The limit switches $20^1$ and $20^2$ are adjustable in position to adjust the length of travel and the limits.

The normal position of the ink supply device with the conduit discharge orifices 9 closed is shown in FIGS. 1 and 2. The distribution conduit 1 is in its extreme right position, and its radial orifices 9 are covered by the sleeves 10, since their orifices 11 are located out of register with the conduit orifices as shown in FIG. 1. In addition, it will be noted that the member 21 (FIG. 2) is at rest abutting against the limit switch $20^2$.

When the ink level falls below the desired level to which the electronic proximity detector 2 is set by means of its vertical adjustment utilizing the clamp sections 25, 26 and set screw 27, the detector senses the lowering of the ink level and activates the motor M. As a result, the motor M rotates the drive gear 16 causing rotation of the gear 18 and this, in turn, produces linear displacement of the worm gear 8 toward the left in FIGS. 1 and 2, until the contact member 21 abuts the limit switch $20^1$. In the latter position, the radial orifices 9 of the distribution conduit 1 have become aligned with the orifices 11 of the fixed sleeves 10, so that the ink inside the conduit 1 is discharged into the ink fountain.

The distance 23 (FIG. 1) which separates the axis of orifices 9 and 11 of the conduit 1 and sleeves 10, respectively, with the sleeves 10 fixed to the casing 13 in the position shown by means of the set screws 38, corresponds to distance 24 (FIG. 2) separating the contact member 21 from the limit switch $20^1$. The sleeves 10 are adjustable lengthwise along the casing 12 by loosening the set screws 38, sliding the sleeves by means of the handles 39, and retightening the screws 38, to provide a means for complete cut-off of the discharge of ink through any one of the conduit orifices 9 as well as a means of original adjustment of the distance 23 to align it with the spacing of limit switches $20^1$ and $20^2$.

One of the important features of the invention is the provision in the ink supply conduit 1 of multiple orifices spaced along the entire length of the conduit, which provides for even flow of ink into the ink fountain throughout the length of the fountain. A further feature is the ability to cut off discharge through any one of the conduit orifices 9, to enable the location of the discharge of ink from the ink supply device to be changed from one segment of an ink fountain to another segment, or the ink fountain effective length to be changed by subdividing the ink fountain of a multicolor press to use only a fraction of the ink fountain length. For this purpose, any one of the sleeves 10 may be moved to the extreme left-hand position allowed by the grooves 40 in the sleeves 10, such that the orifice 11 in the relocated sleeve cannot be reached by the orifice 9 in the conduit even at the full limit of travel of the conduit.

With the valve sleeves 10 located in the casing 13 in the positions shown in FIG. 2, both orifices 11 in conduit 1 will be opened at the left-hand limit of the linear displacement of the conduit 1 to discharge ink into the ink fountain. Both such orifices 11 will be closed at the other limit of travel of the conduit, the right-hand limit which is the position of the members shown in FIGS. 1 and 2.

In keeping with the invention, automatic control means are provided for operating the motor M to produce limited linear displacement of the worm 8, its output portion 7, and the conduit 1 fastened thereto. For this purpose electrical connections are included in the head H to provide a control circuit schematically illustrated in FIG. 5 embodying the proximity detector 2, the limit switches $20^1$ and $20^2$, the relay R and its contacts R-1, R-2, a power source S, and the armature windings of the motor M. The proximity detector 2 is essentially a switch device which when the detector senses the proximate level of the ink in the ink fountain connects the minus bus from the power source to the output terminal 42 of the detector 2. When the liquid ink level falls below the desired level so that it is no longer proximate to the detector 2, the internal circuitry of the detector switches the minus bus from the output terminal 42 and connects the plus bus to that terminal 42. A manually actuated on-off switch 44 is included to connect the plus bus to the detector 2 and thus activate the detector section of the circuit.

In the illustrative circuit of FIG. 5, the proximity detector 2 is shown connected to operate a relay R having contacts R-1 and R-2 in the motor control section of the circuit. In the state of the circuit shown, the relay R is deenergized. With the relay R deenergized, the relay contacts R-1 and R-2 are in the normal position shown connecting the power source S to the armature windings of the motor through the normally closed limit switch contacts $20^1$ and causing the motor M to advance the worm 8 and ink supply conduit 1 in a right to left direction as viewed in FIG. 1 to open the valve means associated with the conduit orifices 9.

At the left-hand limit of linear displacement of the conduit 1, member 21 contacts and opens the limit switch contacts $20^1$. This disconnects the power source S from the motor armature windings and stops the motor M. Ink flow has begun from the conduit orifices 9. Ink level rises as the flow continues. When the ink reaches the predetermined level that is desired, the liquid level being proximate is sensed by the proximity detector 2 which internally switches to disconnect the plus bus from the output terminal 42 of the proximity detector 2 and to connect the minus bus to the output terminal 42. This turns the transistor T on and energizes the relay R, causing the relay contacts R-1, R-2 to reverse from the positions shown in FIG. 5. This has the effect of connecting the power source S to the armature windings of the motor M through the relay contact R-2 and limit switch contacts $20^2$ and applies a reverse polarity to the armature windings and reverses the direction of rotation of the motor M to cause the conduit 1 to return in a left to right direction in FIG. 1. The motor will continue to run in the reverse direction until the member 21 hits the limit switch $20^2$ and opens its contacts. That will disconnect the minus side of the power source S from the motor and stop the motor.

When the ink level falls, the proximity detector 2 will internally switch to disconnect the minus bus from the output terminal 42 and connect the plus bus to this output terminal, turning the transistor T off and deenergizing the relay R. Deenergization of the relay R will drop out the contacts R-1 and R-2 to the positions shown in FIG. 5, which will start the motor in the forward direction. This allows the limit switch contact $20^2$ to close such that the state of the circuit is as illustrated in FIG. 5, except for the normal on-off switch 44 and which is in its off position, while it must, of course, first be activated to enable the proximity detector section of the circuit.

What is claimed is:

1. In an ink supply and ink level control device for mounting on an ink fountain of a printing machine, the combination comprising:

a control and power head having an output member reciprocably mounted in and extending from said head, a reversible drive motor connected to produce limited linear displacement in one direction or the other of said output member, a pair of spaced limit switches mounted for operation in response to movement of said output member to the limits, respectively, of its linear displacement, and an electronic proximity detector projecting from said head toward the surface of ink in said ink fountain to sense the relative proximity of said surface of said ink; and an ink supply conduit and casing assembly carried by said control and power head, said assembly including a conduit for receiving ink from a source of ink and connected to said output member for limited linear displacement thereby, an elongated tube-like casing partially enclosing said supply conduit and fixed at one end to said head, a valve sleeve fixed in said casing and surrounding and slidably receiving said supply conduit, said valve sleeve having a radial orifice, said conduit having a wall orifice located for movement into and out of radial registry with said valve sleeve orifice upon linear displacement of said conduit by said output member, said valve sleeve, said conduit and said orifices therein providing valve means for controlling the discharge of ink from said conduit which are opened at one limit of the linear displacement of said conduit by said output member and are closed at the other limit of its linear displacement thereby, said control and power head further having automatic control means for maintaining a predetermined level of ink in the ink fountain comprising electrical circuit means connecting said proximity detector to activate said motor responsive to the level of ink in the ink fountain falling below a predetermined level to displace said output member and conduit in one linear direction for opening said valve means, and connecting one of said limit switches to deactivate said motor upon movement of said conduit to its limit in said one linear direction for maintaining said valve means opened for supplying ink to the ink fountain, and electrical circuit means connecting said proximity detector to activate said motor responsive to the level of ink in the ink fountain at the predetermined level to displace said output member linearly in the other direction for closing said valve means, and connecting the other of said limit switches to deactivate said motor upon movement of said conduit to its limit in said other direction for maintaining said valve means closed and terminating the supply of ink to the ink fountain.

2. In an ink supply and ink level control device, the combination according to claim 1 wherein said assembly includes longitudinally spaced valve sleeves each including a radial orifice, and said conduit includes longitudinally spaced orifices located for movement into and out of registry with respective ones of said valve sleeve orifices, for controlling the discharge from a plurality of locations along said conduit into said ink fountain.

3. In an ink supply and ink level control device, the combination according to claim 2 further including means for releasably fixing said valve sleeves in different positions along said casing so as to enable, selectively, the complete cut-off of ink flow from said conduit orifices.

4. In an ink supply and ink level control device for mounting on an ink fountain of a printing machine, the combination comprising:

a control and power head having an output member reciprocably mounted in and extending from said head, a reversible drive motor connected to produce limited linear displacement in one direction or the other of said output member, a pair of limit switches mounted for operation in response to movement of said output member to the limits, respectively, of its linear displacement, and an electronic proximity detector projecting from said head toward the surface of ink in said ink fountain to sense the relative proximity of said surface of said ink; and an ink supply conduit and casing assembly carried by said control and power head, said assembly including a conduit for receiving ink from a source of ink and mechanically fastened to said output member for limited linear displacement thereby, an elongated tube-like casing partially enclosing said supply conduit and fastened at one end to said head, releasable fastening means between said conduit and said output member and between said casing and said head for disconnecting said assembly from said head, said conduit having a wall orifice, said assembly including valve means for controlling the discharge of ink from said conduit through said orifice which are opened at one limit of the linear displacement of said conduit by said output member and are closed at the other limit of its linear displacement thereby, said control and power head further having automatic control means for maintaining a predetermined level of ink in the ink fountain comprising electrical circuit means connecting said proximity detector and limit switches to activate said motor to displace said conduit to its limit in one linear direction or the other for opening or closing said valve means responsive to the level of ink in said ink fountain.

5. In an ink supply and ink level control device, the combination according to claim 4 wherein said conduit includes longitudinally spaced orifices and said assembly includes valve means for controlling the discharge of ink through each of said orifices.

6. In an ink supply and ink level control device, the combination according to claim 4 wherein said output member has a worm portion, and drive train means are provided for linearly displacing said output member by linearly displacing said worm comprising a drive gear connected for rotation by said drive motor, and a gear encircling said worm having an internal thread cooperating with said worm and external gear teeth meshing with and driven by said drive gear.

* * * * *